Figure 1:
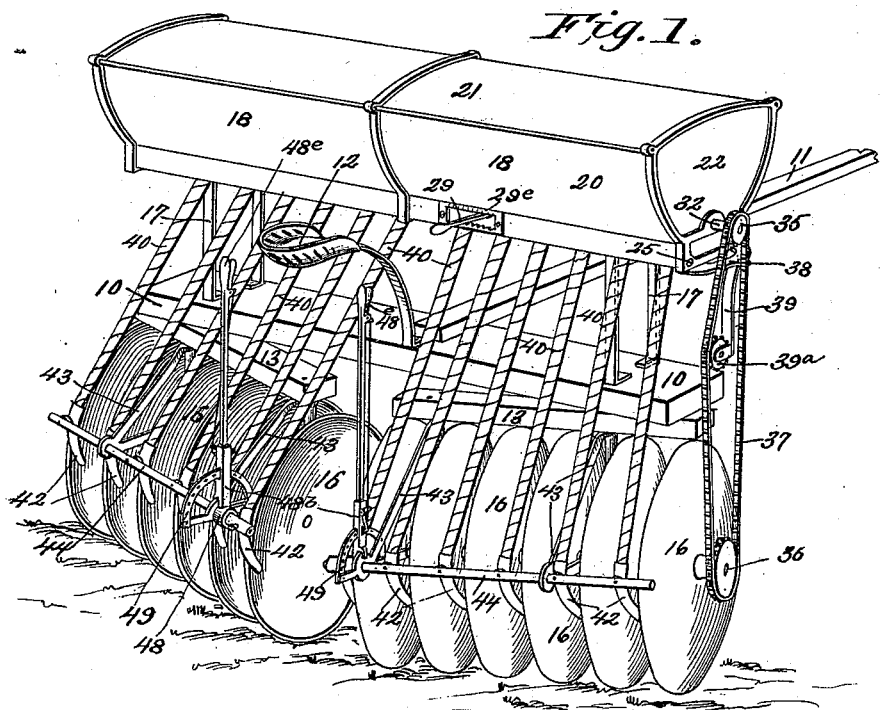

(No Model.) 2 Sheets—Sheet 1.

R. B. SNELL & B. SMITH.
SEED PLANTING MACHINE.

No. 488,846. Patented Dec. 27, 1892.

(No Model.) 2 Sheets—Sheet 2.
R. B. SNELL & B. SMITH.
SEED PLANTING MACHINE.
No. 488,846. Patented Dec. 27, 1892.
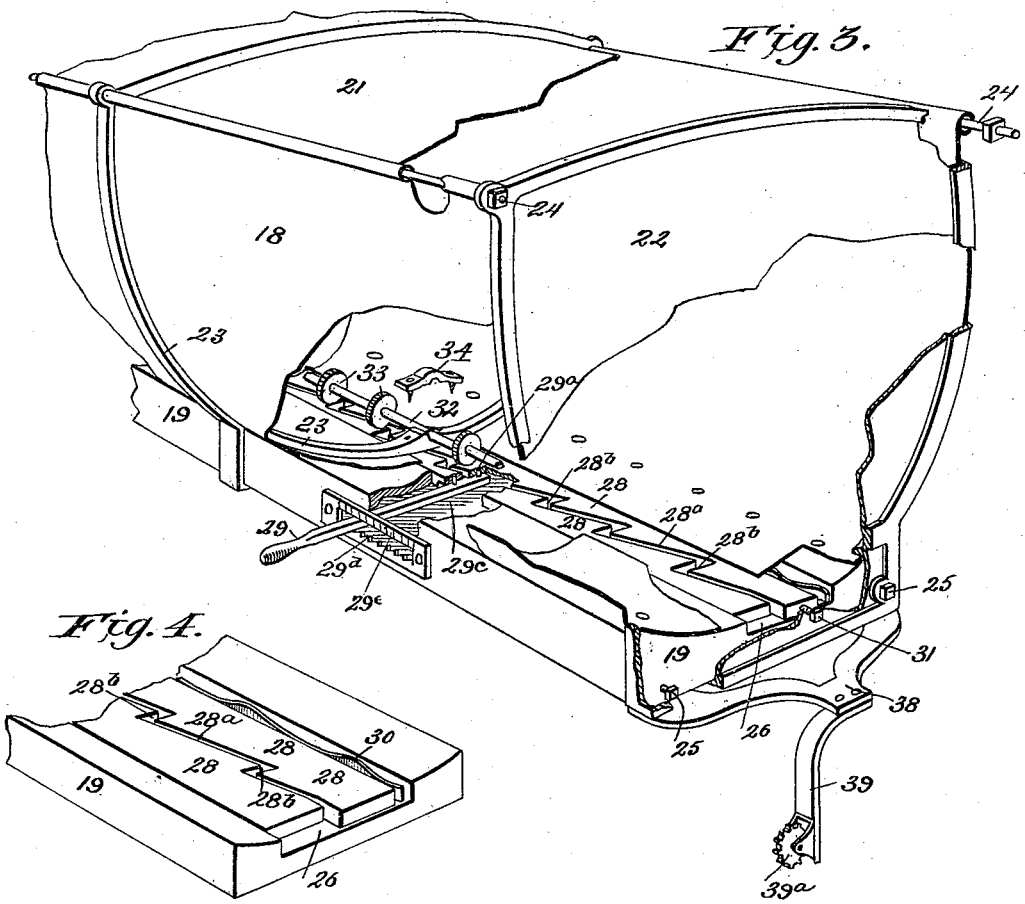
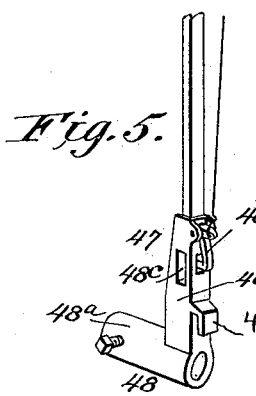
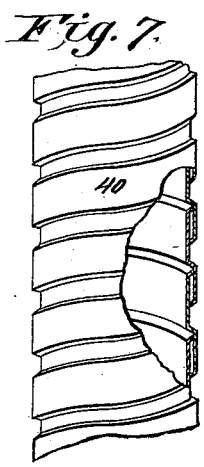
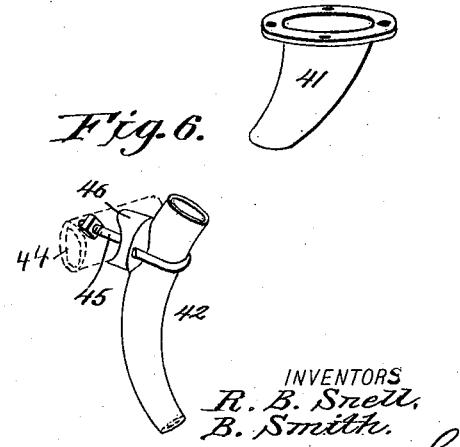
WITNESSES:
Fred G. Dieterich
M. D. Blondel
INVENTORS
R. B. Snell,
B. Smith.
BY Munn & Co.
ATTORNEYS

UNITED STATES PATENT OFFICE.

ROBERT B. SNELL AND BURTON SMITH, OF MONUMENT, KANSAS, ASSIGNORS, BY MESNE ASSIGNMENTS, TO SAID SMITH.

SEED-PLANTING MACHINE.

SPECIFICATION forming part of Letters Patent No. 488,846, dated December 27, 1892.

Application filed March 10, 1892. Serial No. 424,462. (No model.)

*To all whom it may concern:*

Be it known that we, ROBERT B. SNELL and BURTON SMITH, of Monument, in the county of Logan and State of Kansas, have invented a new and useful Improvement in Seed-Planting Machines, of which the following is a specification.

Our invention relates generally to seed planting machines, and particularly to a combined disk harrow and seed drill, the object of our invention being to provide a machine of this character which shall embody, first, a novel form of feed regulator, secondly, a novel form of delivery tube, and, finally, certain other novelties of construction, whereby a simple, cheap, and efficient machine is produced.

The invention consists in the peculiar construction of the various elements and their novel combination or arrangement, such as shown in the drawings set forth in the description, and pointed out in the claims whereby, the several objects are accomplished.

Figure 2:
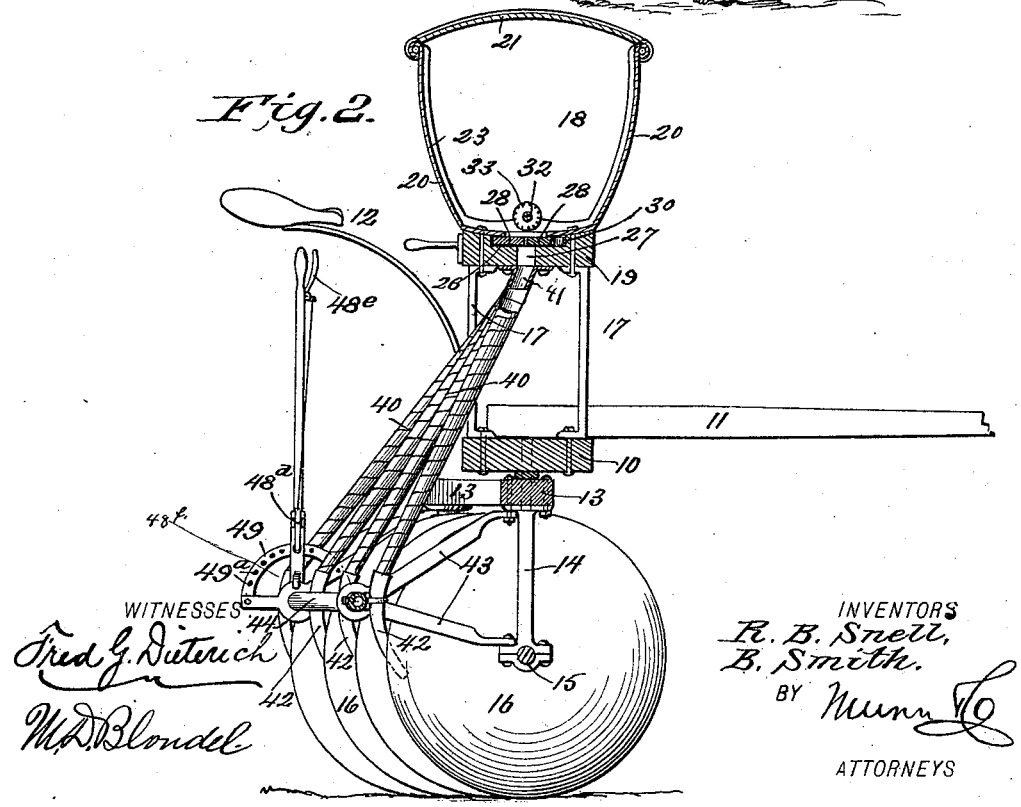

In the drawings forming a part of this specification: Figure 1 is a perspective view of the machine. Fig. 2 is a vertical sectional view of the same. Fig. 3 is a detail perspective view of the seed hopper with parts broken away to disclose the interior mechanism. Fig. 4 is a detail view of the feed regulator. Fig. 5 is a similar view of the lever casting. Fig. 6 shows detail view of the funnel and discharge spout and Fig. 7 is a detail view of the portion of the delivery tube, with a portion broken away to disclose the manner in which it laps, and locks together.

In carrying out our invention, we employ a main beam 10 to which is attached the tongue 11, and the seat 12. Secondary beams 13 are secured to the under side of the main beam, near the opposite ends of the same said secondary beams, being capable of adjustment horizontally to any desired angle. Standards 14 are secured to the under side of each secondary beam, and in the lower ends of each pair of standards, are journaled the axle 15, having the harrow disks 16 rigidly mounted thereon. Supporting brackets 17 are secured to the upper face of the main beam, and upon these brackets is arranged the seed hopper 18.

The seed hopper 18 is constructed with a wooden bottom 19, the sheet metal sides 20 and cover 21, and the cast metal end pieces 22, and partition 23 the sides and end pieces being connected by means of the tie rods and nuts 24, while the bottom and end pieces are united by means of the bolts 25. The bottom 19 has a central, longitudinal groove or depression 26, formed in the upper face of the same and discharge openings 27 are produced in the bottom at regular intervals, and communicate with the central groove or depression.

Within the groove 26, are arranged the parallel gage strips 28, having zigzag opening edges $28^a$, said edges being so constructed that they will mate, that is, the projections on one strip, will snugly fit in the recesses formed in the other strip between two adjacent projections and they are also constructed in such a manner that they may slide, one upon the other, to produce a series of gradually increasing, or decreasing openings $28^b$ at different intervals, through which seed may escape from the hopper. A lever 29 is connected with the strips by means of the pivots $29^a$ said lever working in an opening $29^c$, produced in the rear side of the bottom of the hopper, and the entrance of this opening is provided with a toothed plate $29^d$ by means of which the lever may be locked after the strips have been properly adjusted, and this entrance is also provided with a scale $29^e$ which indicates the extent of opening produced by the adjustment. The strips sliding upon each other spread laterally and it is therefore necessary to provide space for the same within the groove 26, and in order to keep the strips in contact with each other, we employ a serpentine spring 30 between the forward strip and the face of the groove. The strips 28 and spring 30 lie flush with the bottom of the hopper, and the forward side of said hopper is extended as shown, to cover the space between the forward strip and face of groove thereby preventing the seed accumulating in said space which would render adjustment of the strips difficult. A regulating screw 31 is adjustable, in one end of the hopper, opposite the end of one of the strips, the object of said screw being to limit the maximum adjustment of said strip, and by turning this screw in or out the limit can be varied as desired. A rotary shaft 32 is journaled in the hopper and carries the stirrer wheels 33 one over each opening 28$^b$. This shaft 32 is preferably made in two sections jointed in the central partition, said joint being made secure, by means of a clip 34, which covers the same. One end of the shaft 32 is projected through the end of the hopper, and upon said end is mounted a sprocket wheel 35. A sprocket wheel 36. is also mounted upon the adjacent end of the axle, and around said sprockets is passed an endless drive chain 37, by means of which the rotary motion of the axle is communicated to the shaft 32 revolving the stirrer wheels, which facilitates the escape of seed through the openings 28$^b$. A horizontal bracket 38 is secured to the bottom of the hoppers beneath the sprocket 35 and to the end of this bracket is secured a spring arm 39 carrying a roller 39$^a$ which engages the drive chain and keeps the same taut. Delivery tubes 40. conduct the seed discharged from the hopper, to the sides of the harrow disks each of said tubes having a funnel 41 at its upper end, said funnel being secured to the under side of the hopper beneath the discharge opening and to the lower end of each delivery tube is attached the discharge spout 42. Each delivery tube 40 is formed of a single piece of sheet metal coiled spirally into the form of a tube, the manner of construction and advantages being explained farther on. A rearwardly projecting bracket 43 is secured to each standard 14 and in these brackets are journaled an adjustable rock shaft 44, to which the discharge spouts are connected by means of the eye bolts 45. Concave washers 46, being interposed between the spout and shaft, to insure a rigid connection, yet allowing the discharge spouts to be adjusted up or down, or at different angles to the shaft 44. By having the spouts 42, as above and rigidly connected with the rock shaft, they can be adjusted to deliver the seed against the disk at any suitable angle, or at any distance from the disk.

For the purpose of adjusting the shafts, 44 we employ the hand lever 47, one upon the inner end of each shaft, and adjacent to the operator's seat, said lever having a casting 48 secured at the lower end, which casting consists of a sleeve 48$^a$ which is secured upon the shaft 44, and fastened there by means of a set screw, and an arm 48$^b$ to which the lever proper is attached. The arm 48$^b$ is formed with an opening 48$^c$, through which works the curved locking arm 49 secured to the bracket 43, and adapted to hold the lever locked in any desired position by means of the pawl 48$^d$ attached to the side of arm 48$^b$ engaging one of the apertures 49$^a$ produced in the locking arm. The pawl 48$^d$ is operated by means of the finger lever 48$^e$ attached to main lever, and an angular lever 48$^b$ embraces a portion of the bracket 43 and prevents any lateral movement of the shaft 44 within said bracket. The discharge spouts being thus adjustable in various ways, and the secondary beams of the dies being adjustable horizontally at any desired angle, it is necessary that the delivery tubes should also be flexible, elastic, and adjustable, and with this object in view, we provide a flexible, sheet-metal delivery tube, which is formed of a single piece of sheet metal coiled spirally to produce a tube, the lapping edges being bent or folded toward each other, to form a lock that prevents the coils from slipping apart, when lengthened to their full capacity: the overlapping edge also being enlarged, the underlapping edge reduced, that the tube may not increase in diameter as it is coiled upon itself in forming; thus we produce a flexible, elastic, self adjusting metal tube, that accommodates itself to all adjustments and workings of the different parts of our seeding machine and the disk, all of which is clearly shown in Figs. 1 and 7.

In the drawings the discharge spouts are shown arranged upon the convex sides of the disks, whereby the ends are dropped into the furrow just made, by the disks when the seed is instantly covered evenly and perfectly by the soil from each adjacent disk, and it will be understood that by the rise of the hand levers, the seed can be made to drop in the desired spot. By means of the ring bolt, and concave washers, the spout may be adjusted laterally as desired, and by having the delivery tubes flexible, elastic and adjustable as described, these adjustments can be accomplished without removing or disturbing said tube.

The operation of the gage strips will be clear to every one and in practice we prefer to connect only the forward strip with the lever, thereby causing the said forward strip to slide upon the rear one, producing the openings 28$^b$ between the abrupt edges of the strips, and as a stirrer wheel is arranged over each opening, the seed will be fed rapidly as desired to the delivery tubes. The object of having the rotary shaft in two sections, is to facilitate its removal from the hopper easily and quickly, that it may be out of the way when it is desired to remove the seed from the hopper. By these simple yet perfectly working adjustable parts, and by the simple manner in which the brackets carrying the shaft 44, and the hopper are fastened to the standards and beams of the disk, we produce a simple cheap durable and efficient seeding machine for nearly all forms and makes of disks.

Having thus described our invention, what we claim is:

1. In a seed planting machine, the flexible, longitudinally adjustable, lock lapped, sheet metal delivery tube substantially as shown and described.

2. In a seed planting machine, the flexible, longitudinally adjustable lock lapped, sheet metal delivery tube, formed of a single piece and coiled spirally, with edges folded toward each other in manner to form a lock, substantially as shown and for the purpose described.

3. In a seed planting machine, the combination with the seed hopper of the parallel longitudinally movable gage strips arranged in the bottom of the same, and having zigzag edges, and the spring for holding said edges in contact, substantially as shown and described.

4. The combination with the bottom of the hopper, grooved as described, of the zigzag strips arranged in said groove, the levers for operating said strips and the spring for holding the same in contact, substantially as shown and described.

5. The combination with the bottom of hopper, grooved as described, of the gage strips arranged in the groove, the lever, the spring for holding them in place, and the forward side of hopper extending to cover the spring substantially as shown and described.

6. The combination with bottom of hopper, having a longitudinal groove therein and an opening produced in its side, of the gage strips arranged in the groove, the lever in the opening for operating the strip, and the locking and indicator plates all arranged substantially as shown and described.

7. The combination with the hopper having a grooved bottom, of the adjustable gage strips, the operating lever and the regulating screw in the end of the hopper, and in the path of one of the strips, substantially as shown and described.

8. The combination with the hopper having a grooved bottom, of the adjustable gage strips, the operating lever, the spring for holding the strips in contact, and the regulating screw in the end of the hopper. all arranged substantially as shown and described.

9. The combination with the seed hopper, of the axles, and supporting connections, the rearwardly projecting horizontal brackets, the adjustable shaft journaled in said brackets and the delivery tubes connected with the seed hopper, and adjustable shaft, substantially as shown and described.

10. The combination with the adjustable rock shaft, of the discharge spout, the ring bolt, and concave washers, interposed between the spout and shaft, substantially as shown and described.

11. The combination with the seed hopper, standards and axles, of the horizontal brackets the adjustable shaft journaled in said brackets, the flexible, adjustable, lock coiled sheet metal delivery tubes, connected with the seed box and adjustable shaft, and the lever for adjusting said shaft, substantially as shown and described.

12. The combination with the horizontal brackets, of the adjustable shaft, the lever having a casting upon its lower end, the locking bar passing through said casting, the pawl and finger lever, all arranged substantially as shown and described.

ROBT. B. SNELL.
BURTON SMITH.

Witnesses:
H. BEARNES,
U. S. HANDLEY.